United States Patent
Xia et al.

(10) Patent No.: US 11,075,938 B2
(45) Date of Patent: Jul. 27, 2021

(54) IDENTIFYING HIGH RISK COMPUTING OPERATIONS

(71) Applicant: Advanced New Technologies Co., Ltd., Grand Cayman (KY)

(72) Inventors: Jupeng Xia, Hangzhou (CN); Caiwei Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 139 days.

(21) Appl. No.: 16/254,421

(22) Filed: Jan. 22, 2019

(65) Prior Publication Data

US 2019/0158528 A1 May 23, 2019

Related U.S. Application Data

(63) Continuation of application No. PCT/CN2017/093179, filed on Jul. 17, 2017.

(30) Foreign Application Priority Data

Jul. 22, 2016 (CN) .......................... 201610589384.4

(51) Int. Cl.
*H04L 29/06* (2006.01)
*G06Q 20/40* (2012.01)

(52) U.S. Cl.
CPC ......... *H04L 63/1433* (2013.01); *G06Q 20/40* (2013.01)

(58) Field of Classification Search
CPC .............. H04L 63/1433; G06Q 20/40; G06Q 10/0635; G06Q 10/0637; G06Q 20/4016; G06Q 30/0609
See application file for complete search history.

(56) References Cited

U.S. PATENT DOCUMENTS

| 7,809,617 B1 | 10/2010 | Hamilton et al. |
| 2008/0201780 A1* | 8/2008 | Khan .................... G06F 21/577 726/25 |

(Continued)

FOREIGN PATENT DOCUMENTS

| CN | 101236638 | 8/2008 |
| CN | 103279883 | 9/2013 |

(Continued)

OTHER PUBLICATIONS

International Search Report by the International Searching Authority issued in International Application No. PCT/CN2017/093179 dated Oct. 24, 2017; 13 pages.

(Continued)

*Primary Examiner* — Matthew Smithers
*Assistant Examiner* — Mirza Israr Javed
(74) *Attorney, Agent, or Firm* — Fish & Richardson P.C.

(57) ABSTRACT

This specification discloses techniques for risk identification. One example method includes receiving, by a client device, a risk identification request identifying a requested service operation and service data associated with the requested service operation; retrieving, by the client device, service data corresponding to the risk identification request; determining, by the client device, service indicator data associated with the service data; analyzing, by the client device, one or more of the service data and the service indicator based on a risk identification rule or a risk identification model to produce a risk result; and determining, by the client device, whether the requested service operation is a high risk operation based at least in part on the risk result.

19 Claims, 9 Drawing Sheets

(56) References Cited

U.S. PATENT DOCUMENTS

| | | | | |
|---|---|---|---|---|
| 2012/0144492 A1* | 6/2012 | Griffin | ................... | G06F 21/56 |
| | | | | 726/25 |
| 2013/0339186 A1 | 12/2013 | French et al. | | |
| 2014/0207598 A1* | 7/2014 | Lam | ................... | G06Q 20/354 |
| | | | | 705/23 |
| 2015/0199628 A1 | 7/2015 | Grahovac | | |
| 2015/0348042 A1* | 12/2015 | Jivraj | ................... | G06Q 20/322 |
| | | | | 705/44 |
| 2016/0006622 A1* | 1/2016 | Bednarz | ............ | G06Q 10/0639 |
| | | | | 370/252 |
| 2019/0158528 A1* | 5/2019 | Xia | ................... | H04L 63/1433 |

FOREIGN PATENT DOCUMENTS

| | | |
|---|---|---|
| CN | 103532927 | 1/2014 |
| CN | 105117544 | 12/2015 |
| CN | 105516071 | 4/2016 |
| CN | 105556552 | 5/2016 |
| JP | 2008112389 | 5/2008 |
| JP | 2009064127 | 3/2009 |
| JP | 2011008730 | 1/2011 |
| JP | 2013210891 | 10/2013 |
| JP | 2015103078 | 6/2015 |
| KR | 100803889 | 2/2008 |
| KR | 20150106889 | 9/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

European Extended Search Report in European Patent Application No. 17830445.7, dated May 23, 2019, 6 pages.

International Preliminary Report on Patentability in International Application No. PCT/CN2017/093179, dated Jan. 22, 2019, 8 pages (with English Translation).

\* cited by examiner

IDENTIFYING HIGH RISK COMPUTING OPERATIONS

CROSS-REFERENCE TO RELATED APPLICATIONS

This application is a continuation of PCT Application No. PCT/CN2017/093179, filed on Jul. 17, 2017, which claims priority to Chinese Patent Application No. 201610589384.4, filed on Jul. 22, 2016, and each application is hereby incorporated by reference in its entirety.

TECHNICAL FIELD

The present application relates to the field of computer technologies, and in particular, to a risk identification method, a client device, and a risk identification system.

BACKGROUND

With the rapid development of the Internet financial industry, financial services, products, and transaction types are increasing, which also leads to higher service risks. Therefore, Internet service risks need to be controlled.

In an existing risk control system, a centralized server cluster processing method is usually used, and risk identification and control are performed after a server device receives data. In this method, numerous server resources are consumed for data storage, data calculation, and risk analysis, and calculation costs and hardware costs of a server cluster are huge too.

SUMMARY

An implementation of the present application provides a risk identification method, to reduce server device costs in the existing technology, consumption of the server device, and storage costs of risk identification and control.

An implementation of the present application further provides a client device, to reduce server device costs in the existing technology, consumption of the server device, and storage costs of risk identification and control.

An implementation of the present application further provides a risk identification system, to reduce device server device costs in the existing technology, consumption of the server device, and storage costs and calculation analysis costs of risk identification and control.

An implementation of the present application further provides a second risk identification system, to reduce device sever devices costs in the existing technology, consumption of the server device, and storage costs of risk identification and control.

An implementation of the present application further provides a third risk identification system, to reduce device server device costs in the existing technology, consumption of the server device, and storage costs of risk identification and control.

The following technical solutions are used in the implementations of the present application:

An implementation of the present application provides a risk identification method, including: receiving, by a client device, a risk identification request sent based on a service operation request, where the service operation request includes service data; obtaining, by the client device, service data corresponding to the risk identification request; and determining whether the service operation request is risky based on a risk identification rule or a risk identification model, and the service data and/or service indicator data stored in the client device, where the service indicator data is determined based on the service data.

An implementation of the present application further provides a client device, including: a request receiving module, configured to receive a risk identification request sent based on a service operation request, where the service operation request includes service data; a data acquisition module, configured to obtain service data corresponding to the risk identification request; an indicator storage module, configured to store service indicator data determined based on the service data; and a risk identification module, configured to determine whether the service operation request is risky based on a risk identification rule or a risk identification model, and the service data and/or the service indicator data.

An implementation of the present application further provides a risk identification system, including: a client device, configured to receive a risk identification request sent based on a service operation request, where the service operation request includes service data; obtain service data corresponding to the risk identification request; and determine whether the service operation request is risky based on a risk identification rule or a risk identification model, and the service data and/or service indicator data stored in the client device, where the service indicator data is determined based on the service data; and a server device, configured to send the risk identification rule or the risk identification model to the client device by using a data channel, where the risk identification rule or the risk identification model is used to determine whether the service operation request is risky; and receive the service indicator data stored in the client device by using the data channel.

An implementation of the present application further provides a second risk identification system, including: a client device, configured to receive a risk identification request sent based on a service operation request, where the service operation request includes service data; obtain service data corresponding to the risk identification request; and receive, by using a data channel, a result that is determined by the server device, of whether the service operation request is risky; and a server device, configured to receive service indicator data stored in the client device by using the data channel; determine whether the service operation request is risky based on a risk identification rule or a risk identification model, and the service data and/or the service indicator data stored in the client device, where the service indicator data is determined based on the service data; and send, to the client device by using the data channel, the result that is determined by the server device, of whether the service operation request is risky.

An implementation of the present application further provides a third risk identification system, including: a client device, configured to receive a risk identification request sent based on a service operation request, where the service operation request includes service data; obtain service data corresponding to the risk identification request; and receive, by using a data channel, a result that is determined by a cloud risk identification device, of whether the service operation request is risky; the cloud risk identification device, configured to determine whether the service operation request is risky based on a risk identification rule or a risk identification model, and the service data and/or service indicator data stored in the client device, where the service indicator data is determined based on the service data; and a server device, configured to receive the service indicator data stored in the client device by using the data channel;

send the service indicator data to the cloud risk identification device; and send the risk identification rule or the risk identification model to the cloud risk identification device.

At least one of the previously described technical solutions adopted in the implementations of the present application can achieve the following beneficial effects:

In the implementations of the present application, when data used for risk identification is being stored, the service indicator data is determined based on the raw service data, and the service indicator data is stored in the client device. As the service indicator data used for risk identification is stored in the client device, storage costs of the server device can be reduced. In addition, as massive raw service data is converted into the service indicator data for storage, the overall storage costs are reduced. Even if the service indicator data is synchronized to the server device for storage, storage costs of the server device are still lower than those in the existing technology.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to the implementations of the present application and corresponding accompanying drawings. Apparently, the described implementations are merely some but not all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
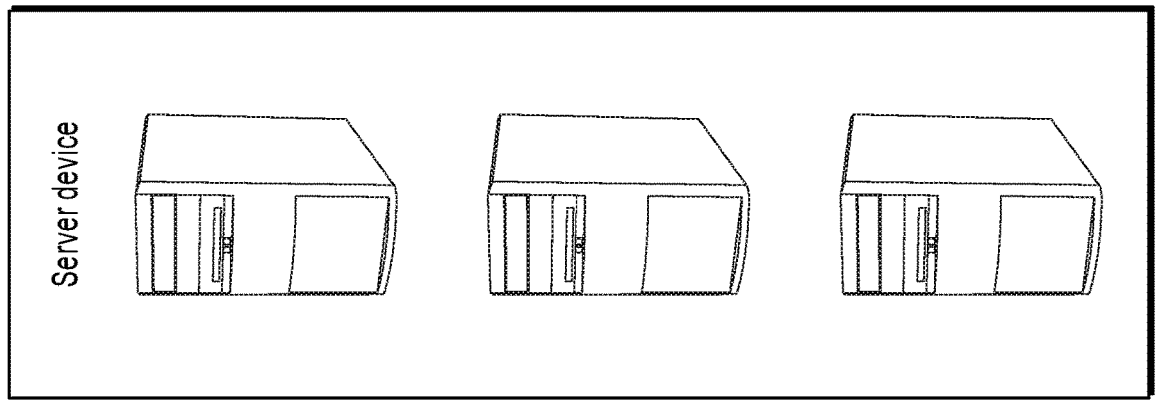
FIG. 1 shows a typical system to which a risk identification method is applied, according to the present application.
Figure 1:
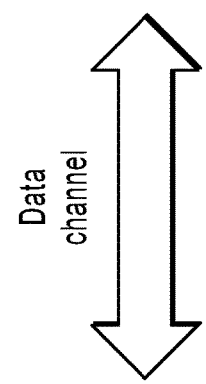
Figure 1:
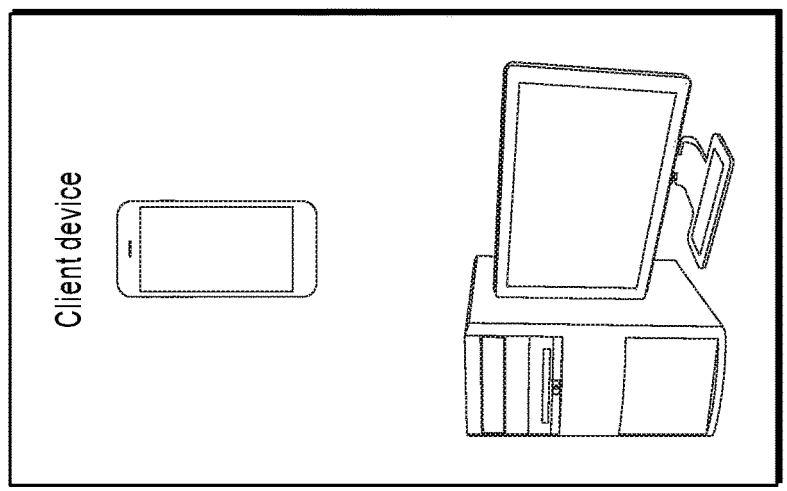

FIG. 1 shows a typical system in practice, according to an implementation of the present application. The system includes a client device and a server device, and data is synchronized between the client device and the server device by using a data channel.

Figure 2:
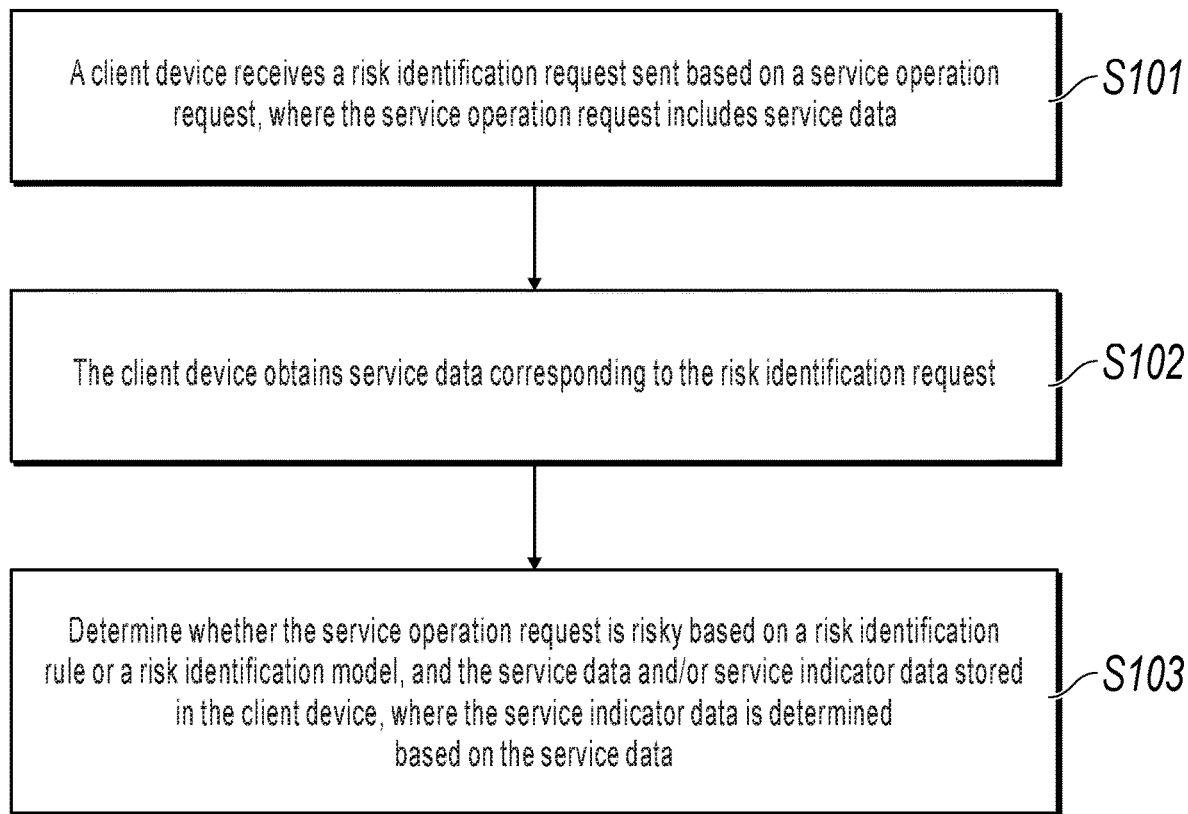
FIG. 2 is a schematic flowchart illustrating a risk identification method, according to an implementation of the present application.

Referring to FIG. 2, a risk identification method provided in this application includes the following steps.

S101: A client device receives a risk identification request sent based on a service operation request, where the service operation request includes service data.

S102: The client device obtains service data corresponding to the risk identification request.

In actual applications, the service operation request is usually sent by a user. After the client receives the service operation request, the client starts a risk identification program to send the risk identification request, if the service operation request belongs to a high risk operation type. The client device can obtain the service data corresponding to the risk identification request based on the risk identification request. To be specific, the client device extracts the service data from the service operation request associated with the risk identification request. For example, the user sends a payment request, and the payment request is a high risk operation type. Therefore, the client device starts the risk identification program to extract service data of a payment service from the payment request, such as login information of the user, hardware environment information and/or software environment information of the client device used by the user, payment account information and/or password information, a current payment amount, and payee information.

In the existing technology, the raw service data usually needs to be sent to a server device and stored in the server device for risk identification and control. In this implementation of the present application, risk identification can be implemented without storing the raw service data in the server device. Certainly, in consideration of data backup, the raw service data can be sent to the server device for storage or can be stored in the client device if the service operation request is completed, a network is idle, or storage space of the server device is sufficient. Technical effects of the present application are not affected.

S103: Determine whether the service operation request is risky based on a risk identification rule or a risk identification model, and the service data and/or service indicator data stored in the client device, where the service indicator data is determined based on the service data.

Figure 8:
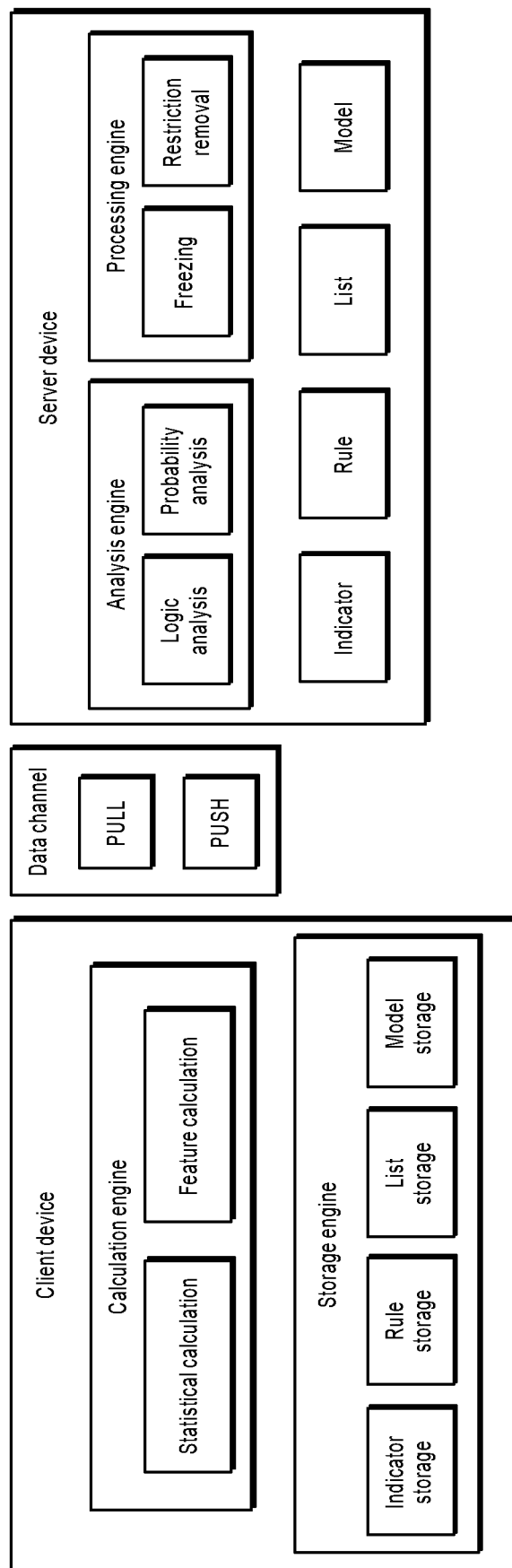
FIG. 8 is an architectural diagram illustrating a fourth risk identification system, according to an implementation of the present application.

In the process of performing step S103 to determine whether the service operation request is risky, the service indicator data needs to be calculated based on the service data and analysis and determining need to be performed based on the service data and/or the service indicator data. The previously described calculation step can be performed by the client device or the server device, and the analysis and determining step can be performed by the client device or the server device. Different calculation methods and content in the calculation step can be performed by the client device or the server device, or can be partially performed by the client and partially performed by the server device. Different content analysis and determining processes in the analysis and determining step can be performed by the client device or the server device, or can be partially performed by the client and partially performed by the server device. Implementations are not limited in the present application. For example, in an implementation shown in FIG. 8, data storage and calculation can be performed by the client device, and analysis and processing are performed by the server device.

A series of statistical calculations can be performed based on the service data to obtain the service indicator data. The service indicator data can represent a historical status of the service operation request corresponding to the service data within a specified time period. A series of statistical values of data generated by the service operation request in a predetermined time window can be calculated. For example, the statistics values can be a count value (COUNT), a sum value (SUM), a first value (FIRST), a last value (LAST), a distinction value (DISTINCT), an average value (AVG), a standard deviation (STDEV), a variance (VAR), a maximum value (MAX), and/or a minimum value (MIN) of an amount or time, and the time window can be one hour, twelve hours, or seven days. For example, calculating "COUNT, successful payment within one hour" means that the number of successful payments times by the client device and the account within the last hour is calculated. Information about the client device and information about the payment account can be from the service data extracted from the service operation request. For another example, calculating "SUM, payment amount within 24 hours" means that the total amount of successful payments by the client device and the account within the last 24 hours is calculated. Information about the client device, information about the payment account, and an amount of each successful payment within 24 hours (related to the service operation request within 24 hours) can be from the service data extracted from the service operation request. A person skilled in the art can understand that, in the first method, the raw service data in the predetermined time window can be stored, and the corresponding raw service data is used to calculate the service indicator data. In the second method, the raw service data is not stored, and when new service data is generated, the service indicator data is recalculated based on the new service data, and the service indicator data is updated. For example, a value of the "COUNT, successful payment within one hour" can be updated over time during each successful payment. In terms of reducing storage costs, the second method is better.

A series of feature calculation can be performed based on the service data to obtain the service indicator data. A frequency feature of the service operation request and/or a running environment feature of the client device can be calculated, and the running environment feature of the client device can include a running software environment and a running hardware environment of the client device. For example, a frequency of performing a payment operation by the client device can be calculated (alternatively, the number of payment operations by the client device in the predetermined time window can be calculated), a frequency of performing a payment operation by an account in the client device can be calculated, and an attenuation degree of a battery of the client device can be calculated.

It is worthwhile to note that the service indicator data is calculated based on the service data. During specific implementation, the calculation process can be performed by the client device or the server device. If the service indicator data is calculated by the client device, the client device obtains the service indicator data through calculation based on the service data. Further, the client device reports the calculated service indicator data to the server device by using a data channel. Correspondingly, the server device receives, by using the data channel, the service indicator data calculated by the client device based on the service data. Calculation is performed by the client device to reduce calculation costs of the server device. After calculation is completed by the client device, the service indicator data is stored in the client device, and can be reported to the server device by using the data channel, to synchronize the service indicator data between the server device and the client device. If the service indicator data is calculated by the server device, the client device first reports the service data to the server device by using the data channel, and then the client device receives, by using the data channel, the service indicator data calculated by the server device based on the service data. Correspondingly, the server device receives, by using the data channel, the service data reported by the client device. The service device calculates the service indicator data based on the service data, and then sends the service indicator data to the client device by using the data channel. In this method, the client device does not need to calculate the service indicator data, so that a design of the client device can be simplified. Also, the client device can receive, by using the data channel, the service indicator data calculated by the server device, to synchronize the service indicator data between the client device and the server device.

When performing step S103 of determining whether the service operation request is risky based on the risk identification rule or the risk identification model, and the service data and/or the service indicator data stored in the client device, the client device can directly perform logic analysis and/or probability analysis on the service data and/or the service indicator data, and determine whether the service operation request is risky based on a result of the logic analysis and/or the probability analysis. In this method, the client device can detect an abnormal service operation request in time through analysis, to better identify, prevent, and control risks. Details are as follows:

The client device performs logic analysis on the service data and/or the service indicator data based on the risk identification rule, and determines whether the service operation request is risky based on a result of the logic analysis; or the client device performs logic analysis and/or probability analysis on the service data and/or the service indicator data based on the risk identification model, and determines whether the service operation request is risky based on a result of the logic analysis and/or the probability analysis.

In addition, optionally, the client device can receive, by using a data channel, a result of logic analysis and/or probability analysis performed by the server device on the service data and/or the service indicator data, and determines whether the service operation request is risky based on the result of the logic analysis and/or the probability analysis. If there is no information about the service data or the service indicator data in the server device, before receiving the analysis result of the server device, the client device further needs to send the service data and/or the service indicator data to the server device by using the data channel. The method of sending the data to the server device for analysis can simplify a design of the client device, and the client device can identify risks based on the analysis result of the server device. Details are as follows:

The client device receives, based on the risk identification rule and by using a data channel, a result of logic analysis performed by the server device on the service data and/or the service indicator data, and determines whether the service operation request is risky based on a result of the logic analysis; or the client device receives, based on the risk identification model and by using a data channel, a result of logic analysis and/or probability analysis performed by the server device on the service data and/or the service indicator data, and determines whether the service operation request is risky based on a result of the logic analysis and/or the probability analysis.

Probability analysis can be performed on the service data and/or the service indicator data by using the risk identification model to obtain a risk probability, and whether there is a risk can be determined based on the risk probability.

Logical analysis can be performed on the service data and/or the service indicator data by using the service data and/or the service indicator data, and the predetermined risk identification rule or the risk identification model. The risk identification rule can be understood as a logical expression, and a status value (true or false) of the logical expression corresponds to a result of whether there is a risk. The service data and/or the service indicator data can be understood as specific values in the previously described logical expression. Example 1: The risk identification rule is predetermined as: (current amount+daily accumulated amount<200) AND (accumulated payment amount of seven days>1 w): Risk-free In the risk identification rule, a value of the "current amount" is from the service operation request that is used for determining whether there is a risk, that is, the current service data; values of the "daily accumulated amount" and the "accumulated payment amount of seven days" are from the service indicator data, and both the service data and the service indicator data are used for analysis in this rule. Output of the logical expression (current amount+daily accumulated amount<200) AND (accumulated payment amount of seven days>1 w)) is a determined status value "true" or "false". If the output of the logical expression is "true" in this rule, it indicates that the service operation request is risk-free.

Example 2: The risk identification rule is predetermined as: (current amount>1 w) OR (current account is not in the risk-free list): Risky In the above risk identification rule, a value of the "current sum" is from the current service data, and information about the "current account" is from the current service data. Therefore, logic analysis is performed based on only the service data in this rule. When it is determined (the current account is not in the risk-free list), the "risk-free list" needs to be known in addition to the "current account". Detailed descriptions will be provided when describing configuration data sent by the server device by using the data channel below.

Example 3: The risk identification rule is predetermined as: (daily accumulated amount>2000) AND (payment times within one hour>3) AND (variance of a payment amount within one hour:<0.3): Risky In the above risk identification rule, values of the "daily accumulated amount", the "payment times within one hour", and the "variance of a payment amount within one hour" are from the service indicator data. Logic analysis is performed based on only the service indicator data in this rule. When output of the logical expression in this rule is "true", it indicates that the service operation request is risky.

In this implementation, the risk identification rule, the risk-free list, and/or the risk identification model that are used when logical analysis or probability analysis is performed to determine whether there is a risk, can all be the configuration data, and service indicator update data can also belongs to the configuration data. The configuration data can be sent by the server device by using the data channel, and the client device receives and stores the configuration data. The configuration data is combined with the service data and/or the service indicator data, to determine whether the service operation request is risky. The configuration data can also be obtained by the client device through training. In a preferred implementation, data is synchronized between the client device and the server device periodically or sporadically. Data such as the service indicator data, the service indicator update data, the risk identification rule, the risk-free list, and the risk identification model are stored in both the server device and the client device. During specific implementation, a network communication mode PUSH can be used, that is, a communication mode in which the server device sends a notification to the client device. In this case, the server device actively instructs the client device to update data stored in the client device when detecting that the data needs to be updated. The data here includes various types of data that need to be synchronized. Alternatively, a network communication mode PULL can be used, that is, a communication mode in which the client device obtains data from the server device. In this case, when the client device receives a notification from the server device or local data of the client needs to be updated, the client actively obtains the updated data from the server device.

In the previously described implementations and the best combinations, after it is determined whether the service operation request is risky, the method in the present application further includes the following: determining a processing method for the service operation request based on a risk identification result of whether the service operation request is risky. There are multiple processing methods for the service operation request. The client device directly executes the service operation request if the service operation request is risk-free. An operation permission of the service operation request needs to be restricted if the service operation request is risky. The client directly restricts the operation permission of the service operation request if the service operation request is risky. Alternatively, the client receives, by using the data channel, a request sent by the server device that is used for restricting the operation permission of the service operation request if the service operation request is risky, and further restricts the operation permission of the service operation request. Further, after the operation permission of the service operation request is restricted, the restriction on the operation permission of the service operation request can be removed after a risk is excluded. The restriction on the operation permission of the service operation request is removed if restriction removal verification information fed back for a restriction removal verification request is received, and the restriction removal verification request can be sent by the client device or the server device.

Figure 3:
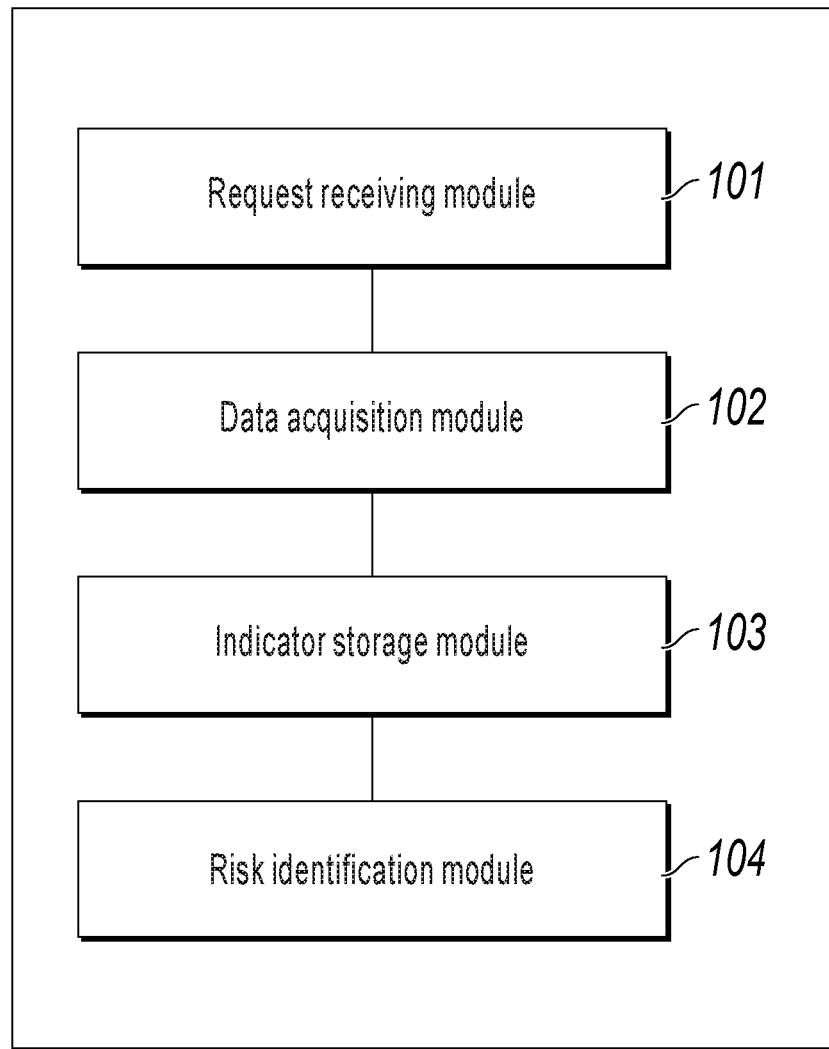
FIG. 3 is a schematic structural diagram illustrating a risk identification device, according to an implementation of the present application.

The present application further provides a client device. Referring to FIG. 3, the client device includes the following: a request receiving module 101, configured to receive a risk identification request sent based on a service operation request, where the service operation request includes service data; a data acquisition module 102, configured to obtain service data corresponding to the risk identification request; an indicator storage module 103, configured to store service indicator data determined based on the service data; and a risk identification module 105, configured to determine whether the service operation request is risky based on a risk identification rule or a risk identification model, and the service data and/or the service indicator data.

Preferably, the client device can further include the following: a configuration data storage module 104, configured to receive and store configuration data synchronized by using a data channel, where the configuration data is combined with the service data and/or the service indicator data, to determine whether the service operation request is risky.

Further, the configuration data storage module 104 includes the following: a rule storage unit 1041, configured to store the risk identification rule that is used to determine whether the service operation request is risky; a list storage unit 1042, configured to store information associated with hardware environment information and software environment information of the client device and/or account information in the client device; and a model storage unit 1043, configured to store the risk identification model that is used to determine whether the service operation request is risky.

Preferably, the risk identification module 105 can include the following: a calculation unit 1051, configured to calculate the service indicator data based on the service data.

Preferably, the risk identification module 105 can include the following: an analysis unit 1052, configured to perform logic analysis and/or probability analysis on the service data and/or the service indicator data based on the risk identification rule or the risk identification model, and determine whether the service operation request is risky based on a result of the logic analysis and/or the probability analysis.

Preferably, the client device can further include the following: a processing module 107, configured to determine a processing method for the service operation request based on a risk identification result of whether the service operation request is risky.

Figure 4:
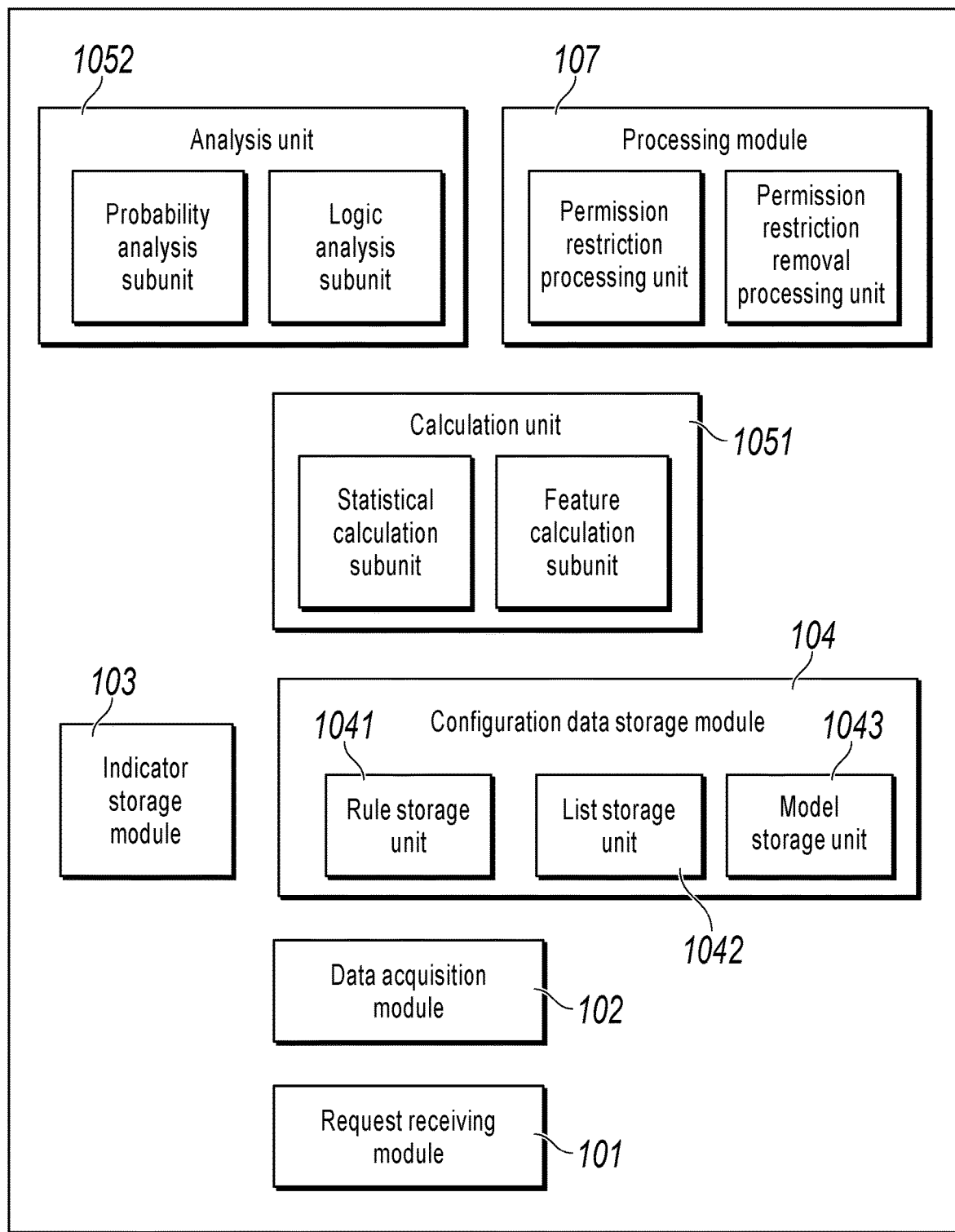
FIG. 4 is a schematic structural diagram illustrating a second risk identification device, according to an implementation of the present application.

FIG. 4 is a schematic structural diagram illustrating a client device, according to a preferred implementation. The device includes a request receiving module 101, a data acquisition module 102, an indicator storage module 103, a configuration data storage module 104, a risk identification module 105, and a processing module 107. The processing module 107 depends on the risk identification module 105. The risk identification module 105 depends on the indicator storage module 102 and the configuration data storage module 104. The indicator storage module 102 depends on the data acquisition module 101. The configuration data storage module 104 depends on configuration data sent by a server device that is obtained by using a data channel. The risk identification module 105 includes a calculation unit 1051 and an analysis unit 1052. The calculation unit 1051 can include a statistical calculation subunit and a feature calculation subunit, and the statistical calculation subunit and the feature calculation subunit are respectively configured to perform statistical calculation and feature calculation. The analysis unit 1052 can include a probability analysis subunit and a logic analysis subunit, and the probability analysis subunit and the logic analysis subunit are respectively configured to perform probability analysis and logic analysis. Principles and implementation methods of the statistical calculation, the feature calculation, the probability analysis, and the logic analysis are described in detail in the previously described implementations of the risk identification method, and details are omitted here for simplicity. In this implementation, raw service data based acquisition, storage, calculation, and analysis are all performed by the client device to implement data-based risk prevention and control and reduce the times of interaction with the server device and a data volume, thereby reducing costs of risk identification and processing by the server device. In addition, because data calculation and analysis are both performed by the client device, a user can perceive and process an abnormal service operation in time, to implement risk prevention and control. Furthermore, the client device performs data analysis to determine whether there is a risk, thereby facilitating calculation of complex data. The configuration data such as service indicator update data, a risk identification rule, a risk-free list, and a risk identification model are obtained from the server device by using the data channel, so that an identification capability of the client device can be better ensured during calculation and analysis.

Figure 5:
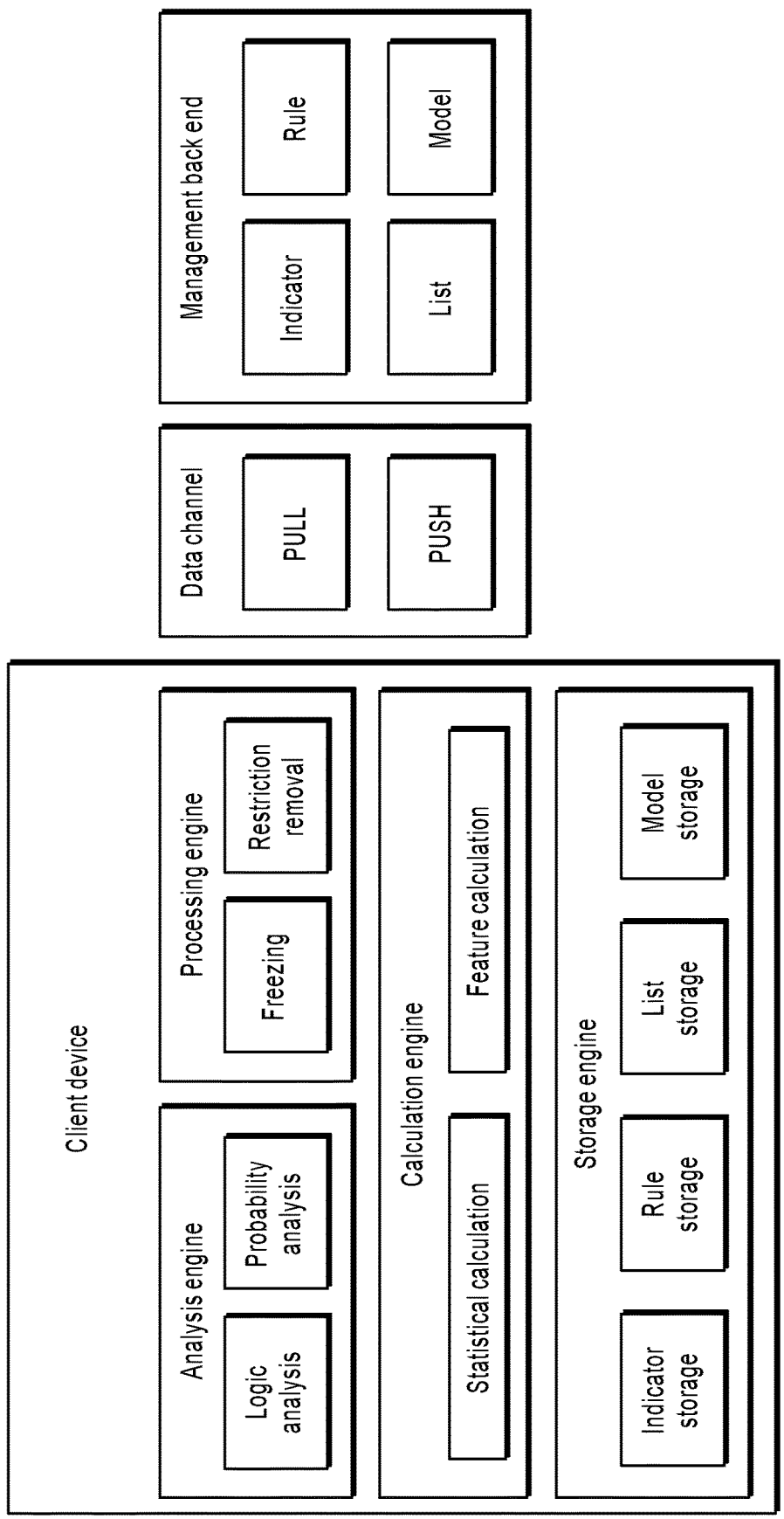
FIG. 5 is an architectural diagram illustrating a risk identification system, according to an implementation of the present application.

FIG. 5 shows a risk identification system, according to an implementation of the present application. The risk identification system includes a client device and a server device.

The client device includes the following: a request receiving module, configured to receive a risk identification request sent based on a service operation request, where the service operation request includes service data; a data acquisition module, configured to obtain service data corresponding to the risk identification request; an indicator storage module, configured to store service indicator data determined based on the service data; and a risk identification module, configured to determine whether the service operation request is risky based on a risk identification rule or a risk identification model, and the service data and/or the service indicator data stored in the client device.

The server device includes the following: a sending module, configured to send the risk identification rule or the risk identification model to the client device by using a data channel, where the risk identification rule or the risk identification model is used to determine whether the service operation request is risky; and a receiving module, configured to receive the service indicator data stored in the client device by using the data channel.

In the schematic block diagram shown in FIG. 5, the client device completes a series of operations such as obtaining, calculating, storing, analyzing, and processing the service data. In FIG. 5, a storage engine is configured to store data, including the service indicator data (stored in the indicator storage module) calculated by the client device based on the service data, and a rule (corresponding to the previous risk identification rule and stored in the rule storage module), a list (corresponding to the previous risk-free list and stored in the list storage module), and a model (corresponding to the previous risk identification model and stored in the model storage module) that are obtained by the client device from a management back end (corresponding to the server device) by using the data channel. After obtaining the service data, the client device starts a calculation engine to perform statistical calculation and feature calculation, stores a calculation result such as the service indicator data in the indicator storage module, and synchronizes the service indicator data to the management back end by using the data channel. An analysis engine performs logic analysis and/or probability analysis on the service data and/or the service indicator data based on the risk identification rule or the risk identification model, and determines whether the service operation request is risky based on an analysis result. Further, a processing engine can process the service operation request based on a risk identification result, including freezing processing (corresponding to restricting the operation permission of the service operation request) and restriction removal processing (corresponding to removing the restriction on the operation permission of the service operation request).

Figure 6:
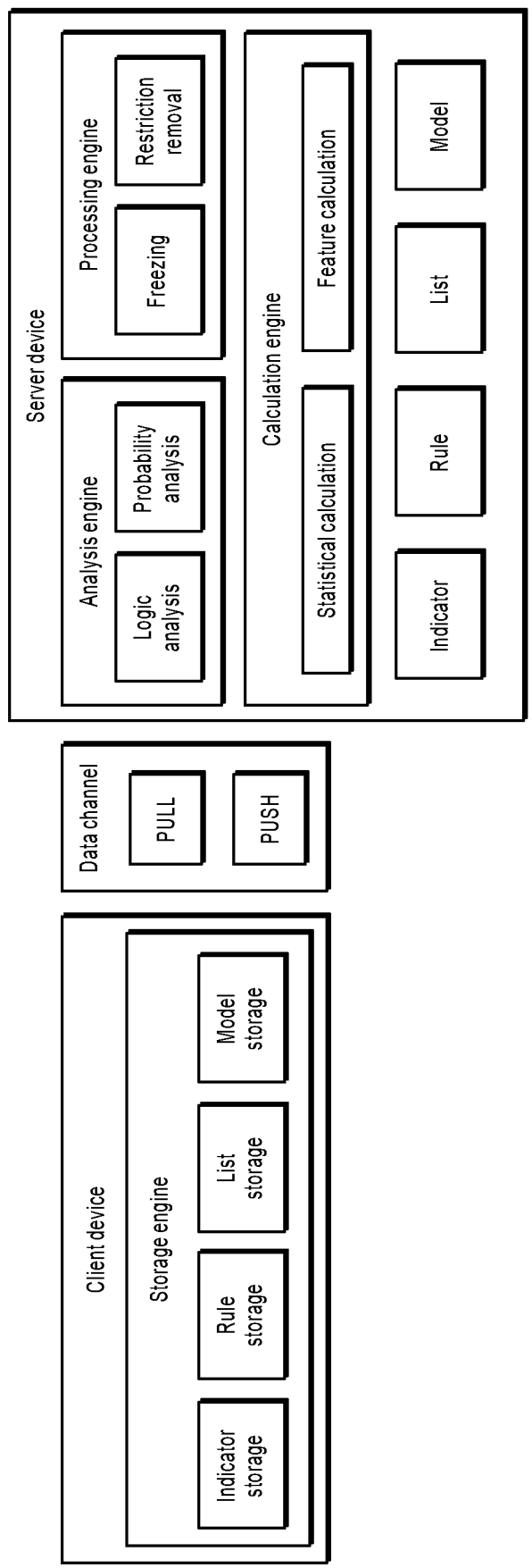
FIG. 6 is an architectural diagram illustrating a second risk identification system, according to an implementation of the present application.

FIG. 6 shows a second risk identification system, according to an implementation of the present application. The second risk identification system includes a client device and a server device.

The client device includes the following: a request receiving module, configured to receive a risk identification request sent based on a service operation request, where the service operation request includes service data; a data acquisition module, configured to obtain service data corresponding to the risk identification request; an indicator storage module, configured to store service indicator data determined based on the service data; and a result receiving module, configured to receive, by using a data channel, a result that is determined by the server device, of whether the service operation request is risky.

The server device includes the following: a receiving module, configured to receive the service indicator data stored in the client device by using the data channel; a risk identification module, configured to determine whether the service operation request is risky based on a risk identification rule or a risk identification model, and the service data and/or the service indicator data stored in the client device, where the service indicator data is determined based on the service data; and a sending module, configured to send, to the client device by using the data channel, the result that is determined by the server device, of whether the service operation request is risky.

In the implementation shown in FIG. 6, the client device includes only a storage engine, and a calculation engine, an analysis engine, and a processing engine are all implemented by the server device, to simplify the client device and reduce a size of a software development kit (SDK) of the client device, thereby reducing integration costs and relieving a problem such as an excessively large installation package.

Figure 7:
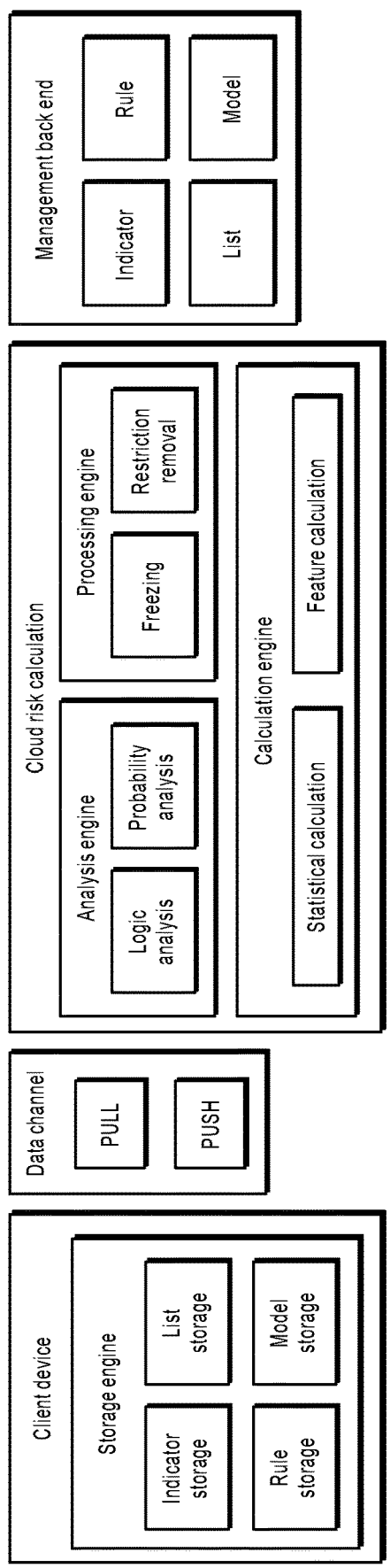
FIG. 7 is an architectural diagram illustrating a third risk identification system, according to an implementation of the present application.

FIG. 7 shows a third risk identification system, according to an implementation of the present application, including a client device, a cloud risk identification device, and a server device.

The client device includes the following: a request receiving module, configured to receive a risk identification request sent based on a service operation request, where the service operation request includes service data; a data acquisition module, configured to obtain service data corresponding to the risk identification request; an indicator storage module, configured to store service indicator data determined based on the service data; and a result receiving module, configured to receive, by using a data channel, a result that is determined by the cloud risk identification device, of whether the service operation request is risky.

The cloud risk identification device includes the following: a risk identification module, configured to determine whether the service operation request is risky based on a risk identification rule or a risk identification model, and the service data and/or the service indicator data stored in the client device, where the service indicator data is determined based on the service data.

The server device includes the following: a receiving module, configured to receive the service indicator data stored in the client device by using the data channel; and a sending module, configured to send the service indicator data to the cloud risk identification device, and send the risk identification rule or the risk identification model to the cloud risk identification device.

In the implementation shown in FIG. 7, a server end is divided into the cloud risk identification device and the server device, to further reduce calculation and analysis burden of the server device and reduce costs of the server end.

A person skilled in the art should understand that an implementation of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device (system), and the computer program product according to the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated-purpose computer, an embedded processor, or a processor of another programmable data processing device to generate a machine, so that the instructions executed by the computer or the processor of the another programmable data processing device generate an apparatus for implementing a specific function in one or more flows in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more flows in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more flows in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. As described in the present application, the computer readable medium does not include computer readable transitory media such as a modulated data signal and a carrier.

It is worthwhile to further note that the terms "include", "includes", or their any other variant is intended to cover a non-exclusive inclusion, so that a process, a method, a merchandise, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, merchandise, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall in the scope of the claims in the present application.

Figure 9:
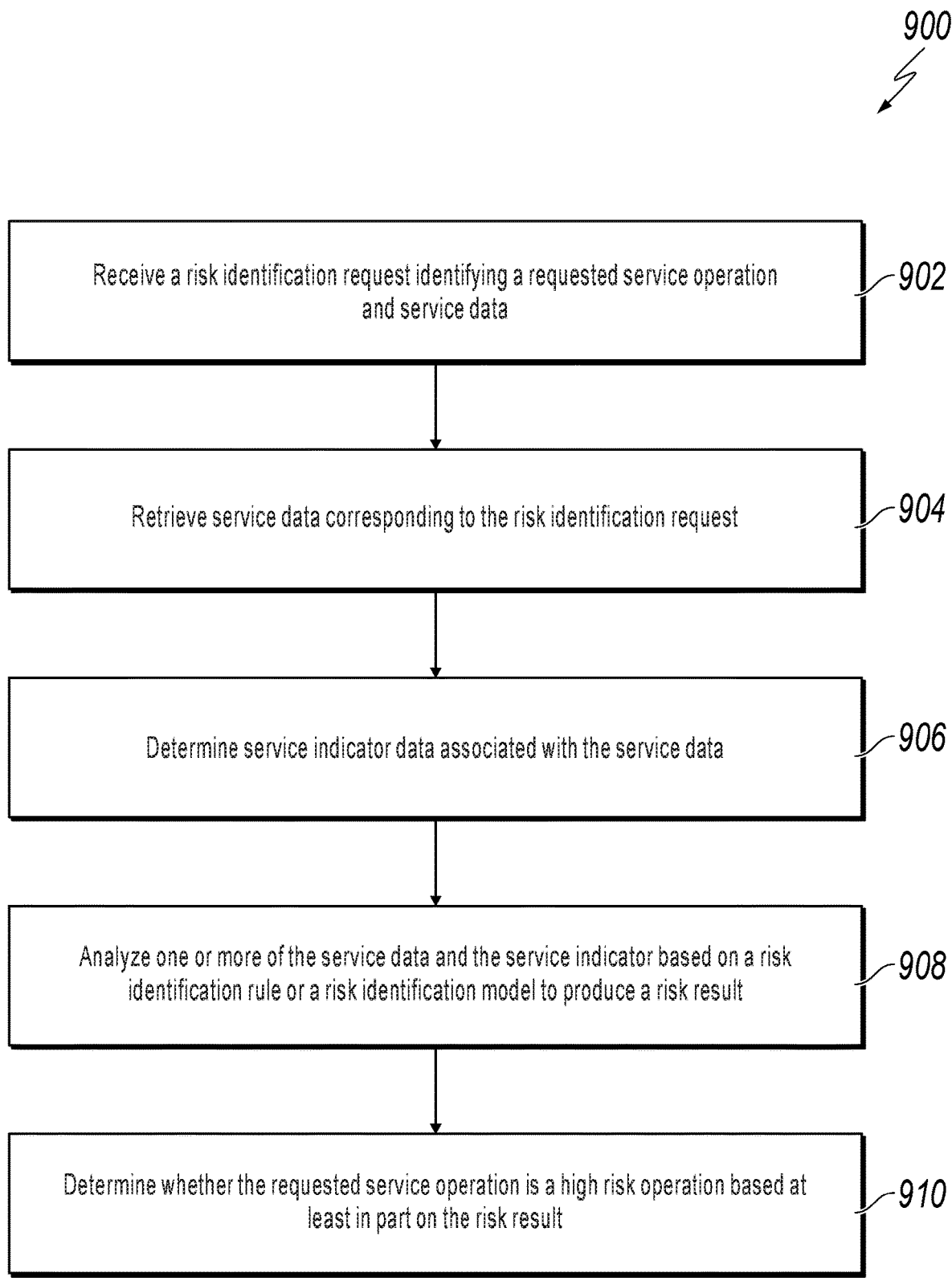
FIG. 9 is a flowchart illustrating an example of a computer-implemented method for risk identification.

FIG. 9 is a flowchart illustrating an example of a computer-implemented method 900 for risk identification, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a client device receives a risk identification request identifying a requested service operation and service data associated with the requested service operation.

At 904, the client device retrieves service data corresponding to the risk identification request.

At 906, the client device determines service indicator data associated with the service data. In some cases, determining the service indicator data based on the service data is based on generating, by the client device, the service indicator data based on the service data. In some cases, determining the service indicator data includes reporting, by the client device, the service data to a server device; and receiving, by the client device, the service indicator data calculated by the server device based on the service data. In some cases, the service indicator data comprises at least one of a frequency feature of the service operation request, a running environment feature of the client device, a count value, a sum value, a first value, a last value, a distinction value, an average value, a standard deviation, a variance, a maximum value, or a minimum value of data generated by the service operation request in a predetermined time window.

At 908, the client device analyzes one or more of the service data and the service indicator based on a risk identification rule or a risk identification model to produce a risk result.

At 910, the client device determines whether the requested service operation is a high risk operation based at least in part on the risk result. In some implementations, determining whether the requested service operation is a high risk operation based on a risk identification rule or a risk identification model client device includes performing, by the client device, at least one of logic analysis and probability analysis on at least one of the service data and the service indicator data based on the risk identification model, and determining whether the requested service operation is a high risk operation based on a result of at least one of the logic analysis and the probability analysis. In some cases, determining whether the requested service operation is a high risk operation includes receiving, by the client device, a result of logic analysis performed by a server device on the service data and the service indicator data based on the risk identification rule, and determining whether the requested service operation is a high risk operation based on the result of the logic analysis. In some implementations, determining whether the requested service operation is a high risk operation includes receiving, by the client device, a result of probability analysis performed by a server device on the service data and the service indicator data based on the risk identification model, and determining whether the service operation request is a high risk operation based on the result of the probability analysis. In some cases, determining whether the requested service operation is a high risk operation is based at least in part on configuration data comprising at least one of service indicator update data, the risk identification rule, a risk-free list, or the risk identification model.

In some cases, in response to generating the service indicator data based on the service data, the client device reports the service indicator data to a server device. In some implementations, in response to determining whether the requested service operation is a high risk operation, determining a processing method for the requested service operation based on a risk identification result indicating whether the requested service operation is a high risk operation. In some cases, determining the processing method for the requested service operation is based on: restricting, by the client device, an operation permission of the requested service operation if the requested service operation is a high risk operation. In some implementations, restricting the operation permission of the requested service is performed in response to receiving a request from the server device.

In some cases, the client device removes the restriction on the operation permission of the requested service operation in response to receiving a restriction removal verification request is received.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for risk identification, the method comprising:
- receiving, by a client device and from a server device, an instruction to update a risk identification rule or a risk identification model stored in the client device;
- obtaining, by the client device and from the server device, an updated risk identification rule or an updated risk identification model;
- receiving, by the client device, a risk identification request identifying a requested service operation;
- retrieving, by the client device, service data corresponding to the risk identification request;
- determining, by the client device, service indicator data associated with the service data;
- analyzing, by the client device, one or more of the service data and the service indicator data based on the updated risk identification rule or the updated risk identification model to produce a risk result;
- determining, by the client device, that the requested service operation is a high risk operation based at least in part on the risk result; and
- in response to determining that the requested service operation is a high risk operation, restricting, by the client device, an operation permission of the requested service operation.

2. The method according to claim 1, wherein determining the service indicator data associated with the service data comprises:
- generating, by the client device, the service indicator data based on the service data.

3. The method according to claim 2, further comprising:
- in response to generating, by the client device, the service indicator data based on the service data, reporting, by the client device, the service indicator data to the server device.

4. The method according to claim 1, wherein determining the service indicator data includes:
- reporting, by the client device, the service data to the server device; and
- receiving, by the client device, the service indicator data calculated by the server device based on the service data.

5. The method according to claim 1, wherein the service indicator data comprises at least one of a frequency feature of the requested service operation, a running environment feature of the client device, a count value, a sum value, a first value, a last value, a distinction value, an average value, a standard deviation, a variance, a maximum value, or a minimum value of data generated by the requested service operation in a predetermined time window.

6. The method according to claim 1, wherein determining that the requested service operation is a high risk operation comprises:
- performing, by the client device, at least one of logic analysis and probability analysis on at least one of the service data and the service indicator data based on the risk identification model, and determining whether the requested service operation is a high risk operation based on a result of at least one of the logic analysis and the probability analysis.

7. The method according to claim 1, wherein determining that the requested service operation is a high risk operation comprises:
- receiving, by the client device, a result of logic analysis performed by the server device on the service data and the service indicator data based on the risk identification rule, and determining whether the requested service operation is a high risk operation based on the result of the logic analysis.

8. The method according to claim 1, wherein determining that the requested service operation is a high risk operation comprises:
- receiving, by the client device, a result of probability analysis performed by the server device on the service data and the service indicator data based on the risk identification model, and determining whether the requested service operation is a high risk operation based on the result of the probability analysis.

9. The method according to claim 1, wherein determining that the requested service operation is a high risk operation is based at least in part on configuration data comprising at least one of service indicator update data, the risk identification rule, a risk-free list, or the risk identification model.

10. The method according to claim 1, the method further comprising in response to determining that the requested service operation is a high risk operation, determining a processing method for the requested service operation based on a risk identification result indicating whether the requested service operation is a high risk operation.

11. The method according to claim 1, wherein restricting the operation permission of the requested service operation is performed in response to receiving a request from the server device.

12. The method according to claim 11, further comprising removing the restriction on the operation permission of the requested service operation in response to receiving a restriction removal verification request.

13. A non-transitory, computer-readable medium storing one or more instructions executable by a computer system to perform operations comprising:
- receiving, by a client device and from a server device, an instruction to update a risk identification rule or a risk identification model stored in the client device;
- obtaining, by the client device and from the server device, an updated risk identification rule or an updated risk identification model;
- receiving, by the client device, a risk identification request identifying a requested service operation;
- retrieving, by the client device, service data corresponding to the risk identification request;
- determining, by the client device, service indicator data associated with the service data;
- analyzing, by the client device, one or more of the service data and the service indicator data based on the updated risk identification rule or the updated risk identification model to produce a risk result;
- determining, by the client device, that the requested service operation is a high risk operation based at least in part on the risk result; and
- in response to determining that the requested service operation is a high risk operation, restricting, by the client device, an operation permission of the requested service operation.

14. The non-transitory, computer-readable medium according to claim 13, wherein determining the service indicator data based-on associated with the service data comprises:

generating, by the client device, the service indicator data based on the service data.

15. The non-transitory, computer-readable medium according to claim 14, the operations further comprising:
in response to generating, by the client device, the service indicator data based on the service data, reporting, by the client device, the service indicator data to the server device.

16. The non-transitory, computer-readable medium according to claim 13, wherein determining the service indicator data includes:
reporting, by the client device, the service data to the server device; and
receiving, by the client device, the service indicator data calculated by the server device based on the service data.

17. The non-transitory, computer-readable medium according to claim 13, wherein the service indicator data comprises at least one of a frequency feature of the requested service operation, a running environment feature of the client device, a count value, a sum value, a first value, a last value, a distinction value, an average value, a standard deviation, a variance, a maximum value, or a minimum value of data generated by the requested service operation in a predetermined time window.

18. The non-transitory, computer-readable medium according to claim 13, wherein determining that the requested service operation is a high risk operation comprises:
performing, by the client device, at least one of logic analysis and probability analysis on at least one of the service data and the service indicator data based on the risk identification model, and determining whether the requested service operation is a high risk operation based on a result of at least one of the logic analysis and the probability analysis.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a client device and from a server device, an instruction to update a risk identification rule or a risk identification model stored in the client device;
obtaining, by the client device and from the server device, an updated risk identification rule or an updated risk identification model;
receiving, by the client device, a risk identification request identifying a requested service operation;
retrieving, by the client device, service data corresponding to the risk identification request;
determining, by the client device, service indicator data associated with the service data;
analyzing, by the client device, one or more of the service data and the service indicator data based on the updated risk identification rule or the updated risk identification model to produce a risk result;
determining, by the client device, that the requested service operation is a high risk operation based at least in part on the risk result; and
in response to determining that the requested service operation is a high risk operation, restricting, by the client device, an operation permission of the requested service operation.

* * * * *